United States Patent [19]
Henrion et al.

[11] Patent Number: 6,050,835
[45] Date of Patent: Apr. 18, 2000

[54] ELECTRICAL CONNECTION DEVICE FOR MOUNTING A COMPONENT IN A MOTOR VEHICLE

[75] Inventors: Carsten Henrion, Karlsruhe; Alexander Popa, Karlsbad; Uwe Schwarz, Ettlingen; Dieter Tschuschke, Eggenstein-Leopoldshafen; Helmut Zischka, Weissach/Flacht, all of Germany

[73] Assignee: Molex Incorporated, Lisle, Ill.

[21] Appl. No.: 09/012,747

[22] Filed: Jan. 23, 1998

[30] Foreign Application Priority Data

Jan. 27, 1997 [DE] Germany ............ 197 02 874

[51] Int. Cl.⁷ ...................................... H01R 13/64
[52] U.S. Cl. .............. 439/247; 439/34; 296/65.05; 296/65.03; 297/217.3
[58] Field of Search .............. 297/217.3; 296/65.05, 296/65.03; 439/247

[56] References Cited

U.S. PATENT DOCUMENTS

| | | | |
|---|---|---|---|
| 4,942,499 | 7/1990 | Shibata et al. ........... | 361/428 |
| 5,106,143 | 4/1992 | Soeters .................... | 296/37.8 |
| 5,106,144 | 4/1992 | Hayakawa et al. ........ | 296/68.1 |
| 5,292,164 | 3/1994 | Rees ....................... | 296/65.1 |
| 5,711,505 | 1/1998 | Nemoto ................... | 248/424 |
| 5,791,731 | 8/1998 | Infanti .................... | 297/217.3 |

FOREIGN PATENT DOCUMENTS

| | | |
|---|---|---|
| 63-68477 | 3/1988 | Japan . |
| 63-169334 | 11/1988 | Japan . |

*Primary Examiner*—Gary F. Paumen
*Assistant Examiner*—Trik Nguyen
*Attorney, Agent, or Firm*—Stacey E. Caldwell

[57] ABSTRACT

An electrical connecting device for a component of a motor vehicle having an electrical functional group, in particular for a motor vehicle seat, comprising a first electrical connector associated with a chassis, a second electrical connector associated with the component adapted to be mated with the first electrical connector upon mounting the component in place on the motor vehicle. Such a device simplifies the mounting and installation of such motor vehicle components and increases the reliability and functional security of the electrical functional groups.

6 Claims, 4 Drawing Sheets

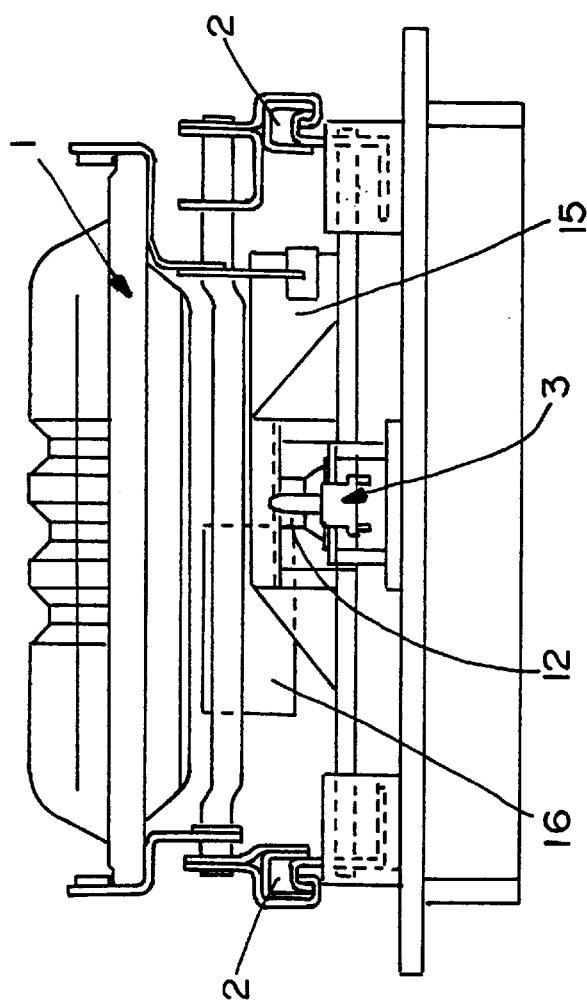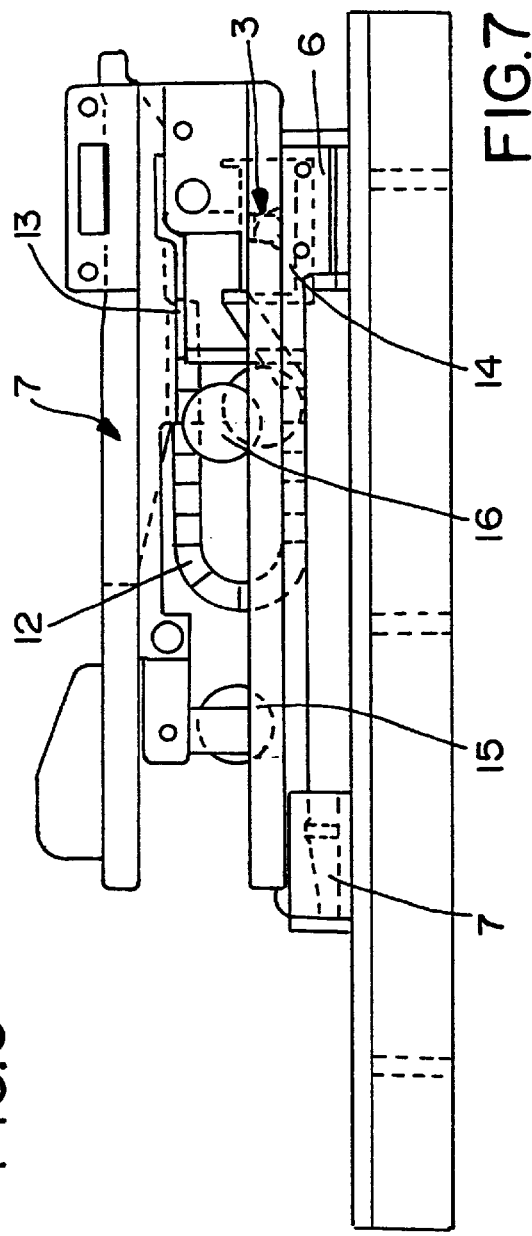

ELECTRICAL CONNECTION DEVICE FOR MOUNTING A COMPONENT IN A MOTOR VEHICLE

FIELD OF THE INVENTION

The invention relates to an electrical connection device for a component of a motor vehicle and in particular for a motor vehicle seat and also to a process for mounting a motor vehicle seat utilizing the electrical connection device.

BACKGROUND OF THE INVENTION

Recent developments in the automotive industry have lead to the inclusion of independent electrical functional groups in individual components of a motor vehicle. For example, motor vehicle seats, in contrast to the conventional, purely mechanical constructions, now may include numerous actuators, sensors or actuating elements. Actuators can be used for the adjustment of the seat height or the angle of inclination, for setting the distance from the steering wheel or for seat heating, for example. Sensors can be used for detecting the locking of a safety belt, for electrical operating or actuating elements, or for airbags for example.

Components such as vehicle seats were heretofore mounted with their own respective electrical plug connections, which were arranged either within the seat or outside the foot space of the passengers, in order to avoid inadvertent damage or disconnection. As a result, the mounting process was time-consuming and costly, since the plug connections were typically individually mated and the accompanying wiring was individually assembled and terminated.

SUMMARY OF THE INVENTION

Accordingly, an object of the invention is to simplify the mounting of motor vehicle components, and in particular, the mounting of motor vehicle seats, and to provide a cost savings and at the same time increase the reliability of the electrical connection between electrical functional groups within the components.

The object is obtained in a simple manner by an electrical connection device utilized for mounting a motor vehicle component, such as a vehicle seat, and by a process for mounting the component.

The electrical connection device includes a first electrical connector associated with a chassis incorporating all of the electrical connections required for a motor vehicle seat, for example, and a second connector associated with the motor vehicle seat adapted to mate with the first connector. The first and second electrical connectors are mated during the mechanical installation or mounting of the seat within the motor vehicle. In this manner, all of the required electrical connections of a particular motor vehicle component can be made during the installation or assembly of the component, such as mounting the seat in the motor vehicle.

The varied requirements of the respective electrical functional groups within a motor vehicle heretofore required the use of different electrical connectors matched to each respective use, such as connectors capable of carrying high currents for seat heating, or the connectors for airbag systems which have special safety requirements. Conversely, the present invention contemplates a single, multipole electrical connector device that provide a reliable connection for all of the electrical functional groups within a vehicular component such as a vehicle seat.

Mounting of the vehicle seat is carried out in a simple manner wherein a mechanical guide provides alignment of the motor vehicle seat relative to the motor vehicle, and includes one of the electrical connector(s) of the connection device.

The motor vehicle seat is brought into an initial or pre-mounting position by means of the mechanical guide, which can, for example, be a pivoting guide having a stop. The seat can then be moved from this initial position by pivoting into its final mounting position, and the electrical connectors can thereby be brought into mated condition.

The mechanical guide may include a folding or pivoting joint which can be joined together laterally.

In order to align the connectors and facilitate mating, the mechanical guide may be equipped with an alignment device by means of which a defined lateral tolerance field is insured during mating.

The mounting of the vehicle seat may be further simplified by the use of a spring within the mechanical guide which elastically connects the motor vehicle seat with a lateral arresting device. The spring allows the movement of the seat into the pre-mounting position to be carried out reliably and without damage regardless of the path of movement. Furthermore, the load of the seat can be substantially taken up by the spring, so that a more accurate and gradual mating of the connectors is made possible.

The reliability of the electrical connection is further increased when one of the connectors comprises a plug connector which incorporates some lateral movement, and the other electrical connector has a funnel-shaped section for facilitating alignment.

In order to prevent damage to the electrical connectors upon mating (due to tolerance build-up or untrained personnel), a device can be incorporated in the mechanical guide which prevents the transfer of the motor vehicle seat from its pre-mounting position into its final mounting position if the motor vehicle seat is not properly placed in the mechanical guide.

Damage to the leads of the electrical functional groups of the motor vehicle between the seat and the chassis is prevented by the placement of the leads in a cable guide chain. The first end of the cable guide chain is held on the motor vehicle seat and its second end is held by the first connector on the chassis or on an extension of the chassis. Furthermore, further damage can be prevented by a tension or strain relief of the cable guide chain in the form of a device for mechanically holding the second end of the cable guide chain to the chassis.

The invention is described hereinbelow by means of preferred embodiments and with reference to the accompanying drawings.

BRIEF DESCRIPTION OF THE DRAWINGS

FIG. 6 shows a front view, shown partially in section, of an underpart of a motor vehicle seat according to the invention;

FIG. 7 shows a side view, shown partially in section, of the motor vehicle seat shown in FIG. 6.

DETAILED DESCRIPTION OF THE PREFERRED EMBODIMENT

Figures 1A, 1B:
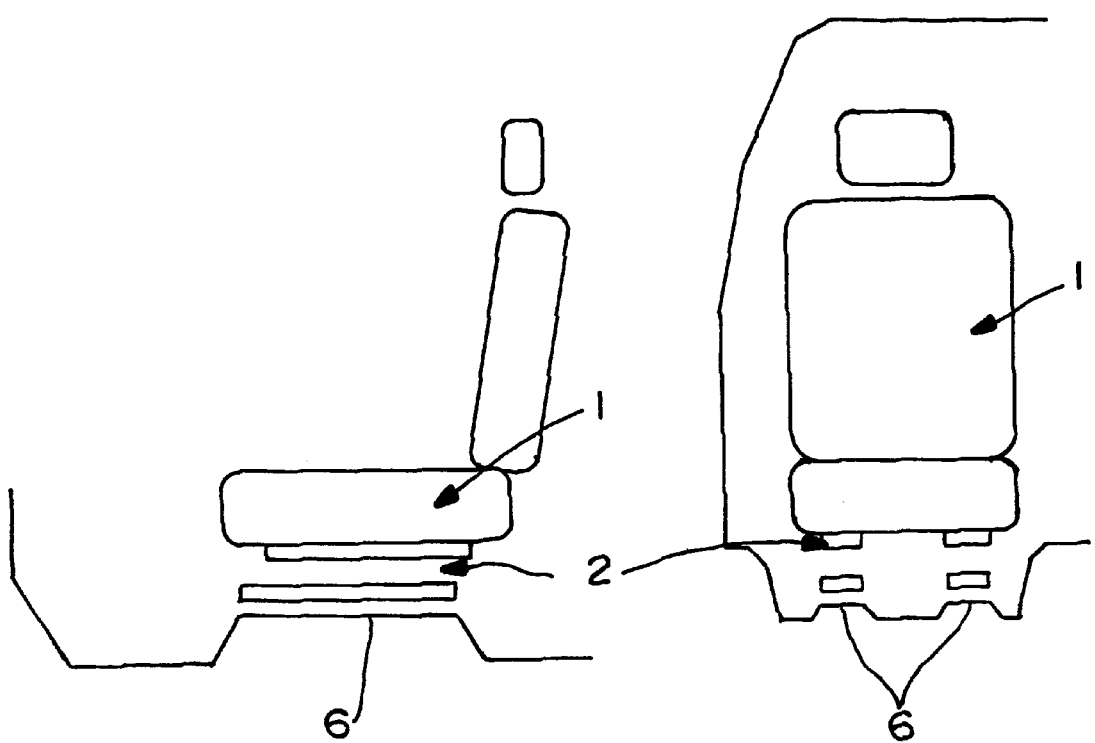
FIGS. 1a and 1b schematically show typical constructional and functional relationships of motor vehicle seats in which the invention can be used.

In the following detailed description, reference is first made to FIGS. 1a and 1b, which show a typical model of front seats in a motor vehicle. The front seat 1 is displaceably held on longitudinal rails 2, and is of open construction beneath its seating surface between the longitudinal rails 2, accessible from the rear passenger compartment.

The motor vehicle seat 1, according to the invention, includes at least one electrical functional group, such as a sensor, actuator, or actuating element, in the form of, for example, an electric motor for mechanical movement of the seat or of parts of the seat, a seat heating system, sensors for detecting a person or the closing of a safety belt, or actuating elements for operating the above-mentioned actuators or of components of the motor vehicle such as internal and external mirrors, side airbags, or the like.

According to the invention, instead of many electrical connection devices being connected individually, a single electrical connection device 3 is contemplated. The device may contain several types of contacts associated with the different electrical functional groups of the particular vehicular component, such as the vehicle seat. The device 3 comprises two connectors 4 and 5 which are adapted to be mated together during mounting of the vehicle seat within the vehicle.

The first electrical connector 5 is associated with, or mechanically fixed to, a part of the chassis or an extension of the chassis 6, and the second electrical connector 4 is associated with, or mechanically fastened to, the motor vehicle seat 1.

Figure 2:
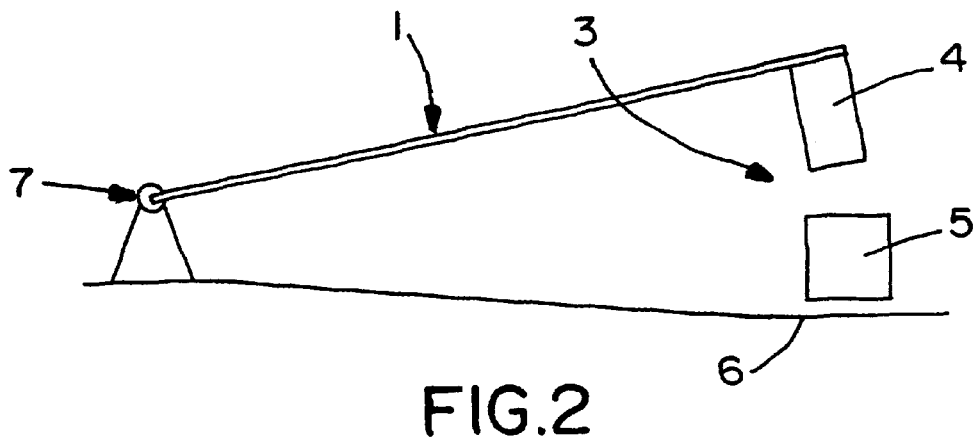
FIG. 2 shows a schematic representation of mutually cooperating functional groups according to the invention.

As shown in FIG. 2, in the premounting position of seat 1, electrical connectors 4 and 5 are not yet mated. However, they are brought into mating engagement by means of a mechanical guide 7, by pivoting seat 1 about a rotation point defined by the mechanical guide 7.

According to the invention, mechanical guide 7 can be a stop fitted to the motor vehicle, about which seat 1 can be pivoted into its mounting position, at which point connectors 4 and 5 are mated together.

In an alternative embodiment, the mechanical guide 7 can be constructed as a folding or pivoting joint which can be laterally joined together, and which can be fastened with one of its joint parts to the chassis 6 and with the other of its joint parts to the frame of the motor vehicle seat 1.

Figure 3:
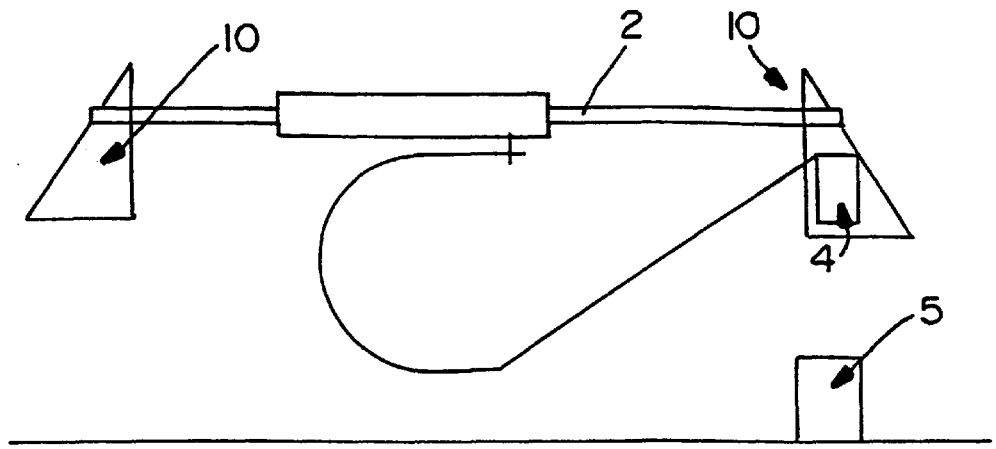
FIG. 3 shows a further schematic representation of functional, constructional groups of an embodiment which is preferred for mounting by means of robots.

In still another embodiment, as shown in FIG. 3, the motor vehicle seat can be moved, by means of a guide arranged on an assembly robot, from its pre-mounting position into its mounting position. It is preferable in any of the embodiments if the mating connectors are self-aligning connectors wherein one of the connectors 4 or 5 incorporates some lateral movement and the other connector has a funnel-shaped section to align the connectors and facilitate mating. The lateral tolerances required for mating would therefore be established.

Figure 4:
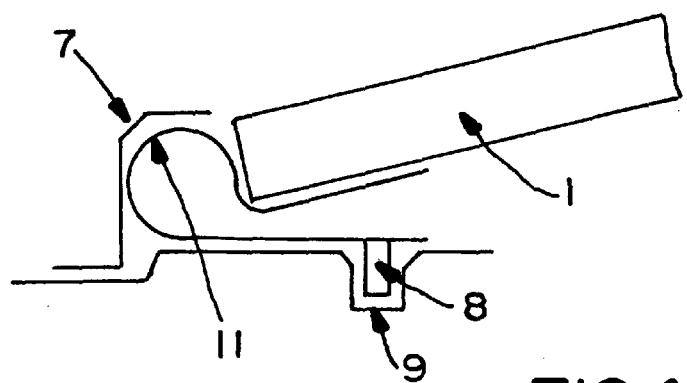
FIG. 4 shows a preferred embodiment of the invention wherein the electrical connection device includes a mechanical guide with at least one resilient element having a lateral stop.
Figure 5:
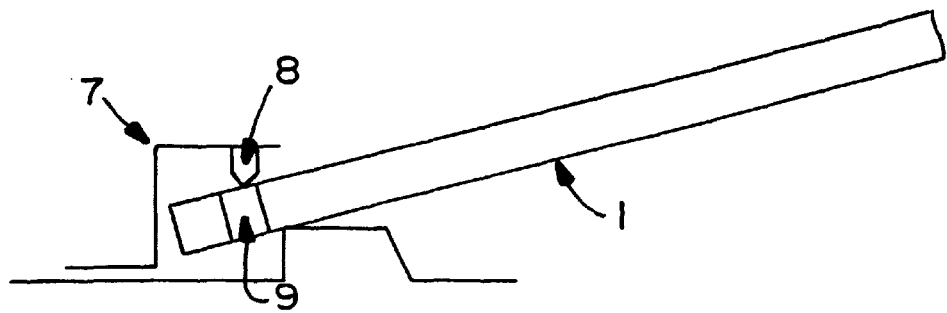
FIG. 5 shows a mechanical guide which prevents the transfer of the motor vehicle seat from its pre-mounting position into its mounting position when the seat is not correctly placed in the guide.

To further improve alignment of the connectors during mounting of the vehicle seat, alignment pins 8 can be provided within the mechanical guide 7 (as shown in FIGS. 4 and 5), which pins engage in respective associated openings 9.

According to the invention, fastening devices 10 for the seat 1 can include lateral guide elements in order to establish the mating tolerance.

In the embodiment shown in FIG. 4, the holding device 7 includes a spring 11 which facilitates the transfer of the motor vehicle seat 1 into its pre-mounting position, particularly during manual mounting. If the seat 1 is not precisely positioned, the spring-loaded alignment pin 8 attached to spring 11 can engage the funnel-shaped opening 9 in the chassis, which opening widens out toward its edge, and therefore the seat can be aligned because of the narrow tolerance field. Furthermore, spring 11 is embodied such that the load of the seat during mounting is taken up and consequently more accurate mounting is made possible.

In FIG. 5, the mechanical guide is constructed such that the transfer of the motor vehicle seat 1 from its premounted position to its mounting position is prevented when the motor vehicle seat 1 is not correctly inserted into the mechanical guide. If the motor vehicle seat 1 is not inserted sufficiently deeply into mechanical guide 7, alignment pin 8 cannot enter the associated opening 9, and motor vehicle seat 1 cannot be pivoted downward. If, however, the vehicle seat is inserted such that the alignment pin 8 can enter the opening 9, the alignment pin 8 will laterally center the seat 1 and thus establish the narrow tolerance field required for mating the electrical connectors 4 and 5.

In a further embodiment of the invention, the leads to the second electrical connector associated with the motor vehicle seat 1 are installed in a cable guide chain 12, the first end 14 of which is held on the chassis or chassis extension 6, and the second end 13 of which is fastened beneath the motor vehicle seat 1.

Because of the small degree to which the cable guide chain 12 can be deflected laterally, defined paths are traced out by the cable guide chain 12 when there is a longitudinal displacement of the seat 1 on the rails 2, and the leads held in it are kept from getting into the longitudinal rails 2 or being damaged by the feet or baggage of the persons in the back of the vehicle.

In a further embodiment, the first end 14 of the cable guide chain 12 can include a strain relief or other fastening device for the connection to the chassis or chassis extension 6.

The mounting of vehicular component or seat 1 according to the invention therefore includes an electromechanical section in the form of an electrical connection device 3 having first and second electrical connectors 4 and 5, and a mechanical unit for mounting and joining together the electrical connectors 4 and 5, in the form of the mechanical guide 7. The mounting and installation of the seat is set forth below.

Figure 8:
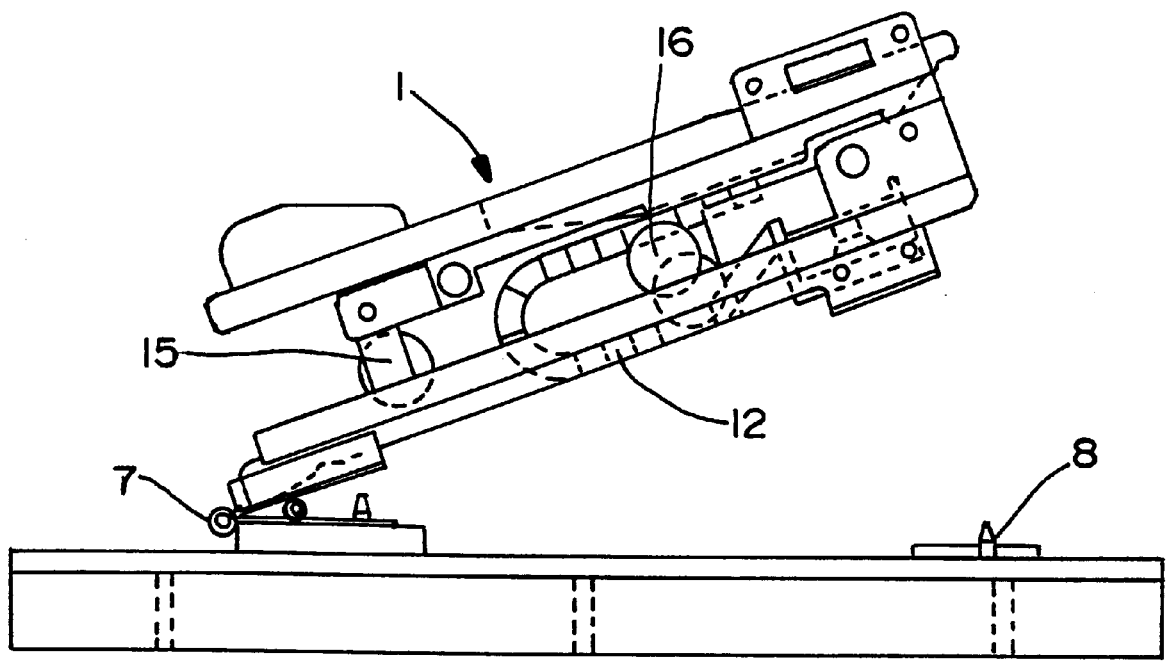
FIG. 8 shows the motor vehicle seat shown in FIG. 7 in its pre-mounted position.

The motor vehicle seat 1 with its numerous electrical functional groups, shown in FIGS. 6, 7 and 8 as motors 15 and 16, is moved into its pre-mounted position, namely the position above or lateral of the mounting position, wherein during the movement of the seat into its mounted position, connector 5, associated with the chassis 6, is mated or assembled to connector 4, associated with seat 1.

In a further embodiment according to the invention, mechanical guide 7 assists movement of the seat 1 into its mounting position, wherein the electrical contact between the first and the second electrical connectors 4 and 5 is made simultaneously with the guided placement of the seat 1 within the mechanical guide.

Seat 1 in its pre-mounting position can be inclined or displaced in height or laterally. However, it is important that, during the movement of the seat into its mounting position, a lateral tolerance field be maintained which lies within the tolerance field of connectors 4 and 5 to effect the precise mating of the assembly.

The invention is not limited to the embodiments described hereinabove. For example, it can also be used in arm rests of motor vehicle seats, in the case that these have actuating elements or the like.

What is claimed is:

1. An electrical connection device for a component (1) of a motor vehicle comprising:

a first electrical connector (5) and a second electrical connector (4), wherein upon mounting the component (1) within the motor vehicle, the first and the second electrical connectors (4, 5) are mated together, and a mechanical guide (7) adapted to align the motor vehicle component relative to the motor vehicle wherein the mechanical guide (7) includes an aligning device (8, 9) which establishes a defined tolerance during mounting, and a spring (11) which elastically connects the motor vehicle component (1) to the aligning device (8, 9).

2. The electrical connection device according to claim 1 wherein the mechanical guide (7) further comprises a pivoting guide having a stop, which allows the motor vehicle component (1) to pivot from a pre-mounted position into a final mounting position.

3. The electrical connection device according to claim 1 wherein the mechanical guide (7) further includes a joint which can be joined together laterally.

4. The electrical connection device according to claim 1 wherein the first and the second connectors (4, 5) are self-aligning connectors such that one of the connectors permits some lateral movement and the other of the connectors has a funnel-shaped section for guiding the connectors into mated condition.

5. The electrical connection device according to claim 2, further comprising a device (8, 9) for preventing the transfer of the motor vehicle component (1) from the premounted position to the mounting position when the motor vehicle component (1) is not correctly inserted into the mechanical guide (7).

6. The electrical connection device according to claim 1 wherein leads of the first connector are held in a cable guide chain (12).

* * * * *